Oct. 29, 1963  F. NETTEL ET AL  3,108,938
POWER PLANT USING A STEAM-COOLED NUCLEAR REACTOR
Filed Oct. 30, 1959                                     2 Sheets-Sheet 1
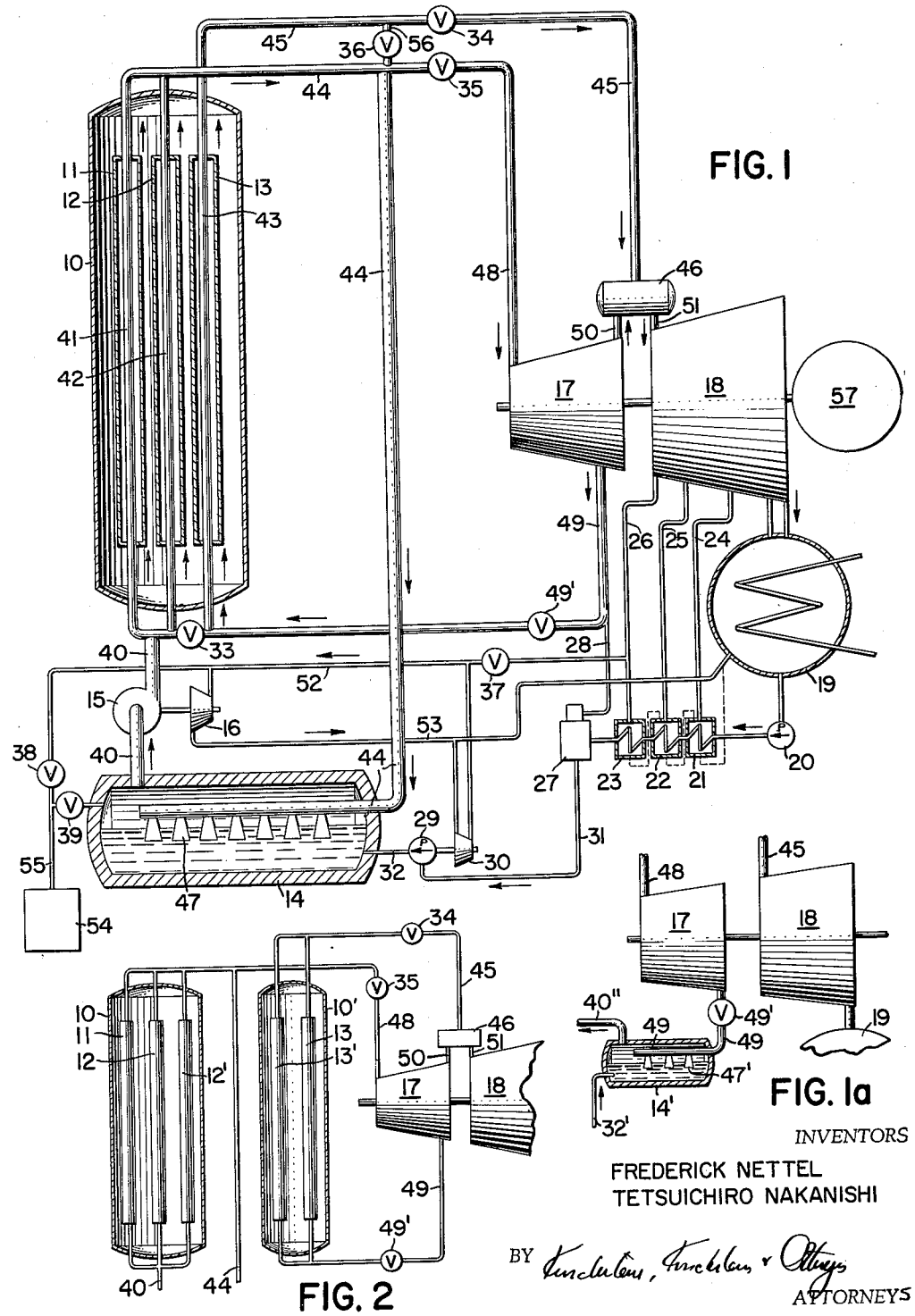
INVENTORS
FREDERICK NETTEL
TETSUICHIRO NAKANISHI
BY
ATTORNEYS

INVENTORS
FREDERICK NETTEL
TETSUICHIRO NAKANISHI

ATTORNEYS

United States Patent Office 3,108,938
Patented Oct. 29, 1963

3,108,938
POWER PLANT USING A STEAM-COOLED NUCLEAR REACTOR
Frederick Nettel, 173 Chapel Road, Manhasset, N.Y., and Tetsuichiro Nakanishi, Tokyo, Japan (% Frederick Nettel, 173 Chapel Road, Manhasset, Long Island, N.Y.)
Filed Oct. 30, 1959, Ser. No. 849,889
7 Claims. (Cl. 204—193.2)

This invention deals with power plants using nuclear reactors for supplying steam to turbines producing useful power.

It is known to employ the Loeffler boiler system for the production of high-pressure saturated steam which can be used as coolant in a reactor. In the Loeffler system, which may be termed a steam-pumping system, saturated steam is taken from an unfired evaporator drum and forced by a steam pump to flow through tubes which are exposed to a heat source (conventional fossil fuel fired or nuclear heat), thus being superheated. A portion of the superheated steam is returned to the evaporator where it produces more saturated steam by losing its superheat, while the rest is led to the steam turbine.

The advantages of this system are well known. It has, however, also its limitations in that it can operate economically only for pressures higher than about 80 atm. G. (1150 p.s.i.g.), preferably 130 to 150 atm. G. (1850 to 2150 p.s.i.g.) because for lower pressures the power requirements of the steam pump increase inordinately.

The use of the Loeffler system in high-pressure power plants involves the necessity to employ reheating of the steam after partial expansion in order to prevent excessive moisture which causes erosion and loss of efficiency in the last turbine stages. Moisture separators cause substantial losses, sometimes more than 10% of the steam flow through the turbine.

Obviously, the use of fossil fuel for reheating would destroy the main advantage of nuclear plants, particularly in marine applications. It must also be remembered that the optimum reheat pressures are only a quarter or one fifth of the top system pressure. At these pressures the specific volume of the steam has vastly increased and its density correspondingly decreased, necessitating large steam passages and large heating surfaces for reheating which are sometimes difficult to provide in the reactor.

It is the principal object of our invention to eliminate the abovementioned defects by providing efficient, simple and economic means to obtain reheat from nuclear heat. The foregoing and other objects, features and advantages of our invention will be apparent in the following specification and drawing which illustrates by way of non-limiting examples embodiments of the invention.

FIG. 1 shows diagrammatically a steam power plant with a nuclear reactor as source of heat.

FIG. 1a illustrates a detail modification of the plant as per FIG. 1.

FIG. 2 shows details of a plant as per FIG. 1 using separate reactors for steam superheating and reheating.

Figure 3:
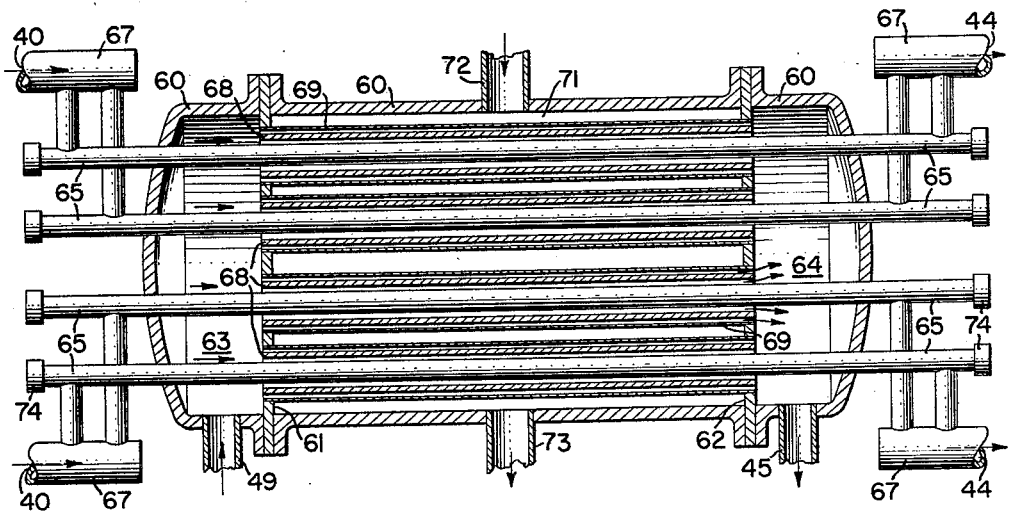

FIG. 3 indicates a horizontal nuclear reactor in part-sectional view, illustrating calandria tube design fuel assemblies with triple concentric tubes for the high-pressure steam, the reheat steam and an auxiliary steam flow for limiting heat loss to the moderator.

Figure 4:
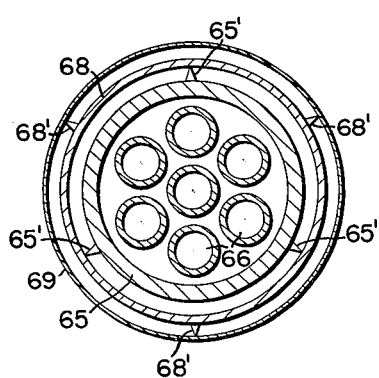

FIG. 4 shows a cross section through the fuel assemblies as per FIG. 3.

Figure 5:
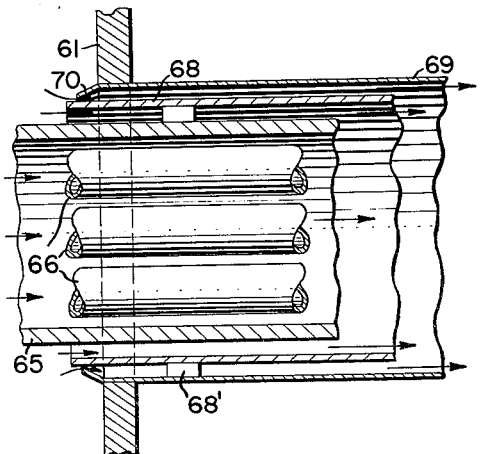

FIG. 5 is a part-longitudinal section through the same fuel assemblies.

The principal object of this invention is achieved by producing high-pressure saturated steam by the Loeffler system, modified in that the saturated steam is superheated by leading it through tubular passages provided in the fuel assemblies of a nuclear reactor, leading the useful part of the superheated steam into a steam turbine wherein it expands to a predetermined intermediate pressure, leading the steam at that reduced pressure from the turbine back into the reactor where it is reheated by flowing through other tubular passages in the fuel assemblies and returning the reheated steam to the turbine for further expansion.

Another object of our invention, i.e. the reduction in the steam flow through the reactor for reheating is achieved by branching off only a portion of the steam coming from the high-pressure stages of the turbine, leading said portion back into the reactor where it is reheated by flowing through other tubular passages in the fuel assemblies, thereafter leading said portion back into the turbine at a stage where the pressure is somewhat lower than the reheat pressure, where after mixing with the remainder of the steam coming from the high-pressure stages, all of the steam continues expansion in the low-pressure stages of the turbine.

Still another object of this invention is to use separate reactor vessels for superheating and for reheating the steam.

An important additional advantage, namely the elimination of radioactive contamination of the steam flowing through the turbine, is achieved by providing direct contact of this steam with liquid water before reheating it.

A further object of our invention is to provide means during starting of the power plant to use all fuel assemblies in the reactor vessel for superheating the saturated steam.

Reverting now in more detail to the drawing:

In FIG. 1 10 is the reactor cylinder vessel with fuel assemblies 11, 12 and 13. 14 is an un-fired pressure vessel, 15 a steam pump driven by an auxiliary steam turbine 16. 17 and 18 is the high-pressure and low-pressure part of the main turbine. 19 the main condenser, 20 its condensate pump, 21, 22 and 23 regenerative feedwater heaters drawing steam from three stages of the turbine through pipes 24, 25, and 26. 27 is a feedwater deaerator drawing steam from the turbine through pipe 28. The high-pressure feedwater pump 29, driven by the auxiliary turbine 30 sucks water from the deaerator 27 through pipe 31 and discharges through pipe 32 into the pressure vessel 14. 33, 34, 35, 36, 37 and 38 are valves in the various pipes whose function will be explained as this specification proceeds. As further shown, the pressure vessel 14 is connected by a pipe 40 to the lower ends of the fuel assemblies 11, 12 and 13, which all are equipped with longitudinal tubular passages 41, 42, and 43.

The passages 41 and 42 are connected to a pipe 44, while the passage 43 is in connection with the pipe 45 which leads to a closed mixing chamber 46. The pipe 44 is connected to the pressure vessel 14, entering it at its upper half and discharging into it via a number of nozzles directed toward the lower half of said pressure vessel. Branched off from the pipe 44 is the pipe 48 leading to the high-pressure inlet of the main turbine 17. At an intermediate stage of the high-pressure part of the turbine 17, a pipe 49, with interposed valve 49' is branched off connecting with the passage 43 in the fuel assembly 13, assuming the valve 33 to be in closed position. The pipe 28 to the deaerator is also in communication with said pipe 49. The mixing chamber 46 is further connected by the pipe 50 to the outlet of the high-pressure casing 17 and by pipe 51 to the inlet of the low-pressure casing 18 of the main turbine. The auxiliary turbine 16 for the steam pump and the auxiliary turbine 30 for the boiler feedwater pump 29 are, assuming the valves 38 and 39 in closed positions, supplied with steam from the extraction pipe 26 via the pipe 52 with valve 37. Steam is discharged from these auxiliaries through the pipe 53 into the condenser 19. 54 is an auxiliary steam boiler of any kind connectable via the pipe 55 and the valve 38 with pipe 52, and via the valve 39 with the pressure vessel 14. These latter two valves are closed during the normal operation of the plant. There is also a connecting pipe 56 between the pipes 44 and 45 which, during normal operation of the plant is kept closed by the valve 36. 57 is a power consumer of any kind mechanically coupled to the main turbine 17, 18.

The plant is started and operated as follows:

Valves 33 and 36 open; valves 34, 35, 37 and 49' closed. Medium pressure-steam is admitted from the auxiliary boiler 54 into the pressure vessel 14 by opening the valve 39 and to the auxiliary turbines 16 and 30 by opening of the valve 38. The vessel 14 is assumed half filled with water so that the ends of the nozzles 47 are submerged. With the reactor 10 critical and the pump 15 operating at low speed, steam is flowing from the vessel 14 through all assemblies 11, 12 and 13 absorbing nuclear heat thus cooling the reactor. The steam superheated in the assemblies is flowing through the pipe 44 and partly through pipe 45 via the valve 36 back to the vessel 14 where it loses its superheat by contact with the water, thereby heating the latter. This continues for some time until the water in 14 has reached the saturation temperature of the steam supplied by the auxiliary boiler 54. Then the continuous heat input into the vessel 14 causes some of the water in the vessel to evaporate and the pressure in the closed path of the steam will tend to rise. At this time the valve 39 can be closed thus shutting the auxiliary boiler off the vessel 14. The steam pressure in the vessel and in the tubular passages 41, 42 and 43 will now rise quickly until a predetermined pressure has been reached. Then the valves 34, 35 and 49' are opened while the valve 33 is closed. Now superheated steam can flow from the pipe 44 to the high-pressure inlet of the turbine 17 via the pipe 48, expanding to an intermediate pressure and continuing via the pipe 50, through the mixing chamber 46, the pipe 51 into the low-pressure casing 18 of the main turbine and thence into the main condenser 19. The resulting condensate flows through the feedwater heaters 21, 22 and 23, the deaerator 27, the pipe 31 into the high-pressure boilerfeed pump 29 and from there returns through the pipe 32 into the pressure vessel 14. A portion of the steam after flowing through the high-pressure casing is branched off through the pipe 49 at an intermediate stage of said high pressure casing, flows into the fuel assembly and through the tubular passage 43, being reheated by nuclear heat to a predetermined temperature, and continues through the pipe 45 to enter the mixing chamber 46. There it mixes with the remainder of the steam issuing from casing 17, so that the mixture attains a temperature somewhere between that of the steam entering through the pipe 50 and the reheated steam entering through the pipe 45. Thus a substantial reheat of all of the steam entering the low-pressure casing 18 can be achieved, the degree of said reheat depending (a) on the amount of steam branched off through the pipe 49, and (b) the temperature to which this branched off steam is reheated in the reactor.

After the main turbine begins to furnish power and the pressure in the extraction pipe 26 reaches a substantial value, the valve 38 can be closed and the valve 37 opened so that the main turbine can take over the steam supply to the auxiliaries 16 and 30, and the auxiliary boiler completely disconnected and possibly shut down. Other steam consumers, for example on a ship, can also be connected to the pipe 49.

The output of the plant is determined by the heat furnished from the reactor. Regulation is effected by adjusting the speed of the steam pump as known in Loeffler boilers using fossil fuels.

Proper dimensioning of the heating surfaces of the tubular passages 41 and 42 is necessary to achieve the required steam output at the required superheat, and of the tubular passage 43 to achieve the best reheat temperature of the portion of the turbine steam flowing through, so as to attain the desired reheat temperature of all of the turbine steam at the entrance of the low-pressure casing 18.

In the plant as per FIG. 1 all fuel elements must be cooled once the reactor has gone critical. This necessitates the use of the fuel assemblies which are normally used only for reheating, for superheating the steam during the starting period of the plant, i.e. until the main turbine supplies partly expanded steam through the pipe 49 for cooling the assembly 13.

If highest possible reheat temperature is required, all of the steam must be led back through the reactor for reheating. For this purpose the arrangement as per FIG. 1 must be so modified that all the steam is branched off after the last stage of the high-pressure casing 17, and returned to the low-pressure casing 18 through the pipe 45. As will be obvious, the elements 46, 50 and 51 are omitted. This modification is shown in FIG. 1a.

It is known that radioactive products mostly in form of particles which may be carried over from the fuel elements by the cooling steam can be separated from said steam if it is brought in direct contact with water in which also some of these contaminants are soluble. In plants according to this invention the pressure vessel 14 effects this separation for the steam circulating through the Loeffler system, but not for the steam flowing through the turbine. If no provision is made for decontaminating this steam, all parts of the turbine, the condenser and the feedwater heating system might become strongly radioactive, especially in case of damage to a fuel element.

To eliminate this danger, our invention provides another closed pressure vessel 14', see FIG. 1a, interposed in the pipe 49. This second vessel is basically of similar design as the vessel 14, being filled about half with water. The pipe 49 enters above the water level and discharges downwards through steam nozzles 47' below the water surface. The steam leaves the vessel 14' via the pipe 40'' which is connected to the tubular passages provided for reheating in the reactor, in FIG. 1 passages 43, in FIG. 3, described later, passage annulus between the tubes 65, 68 and 69.

The steam entering the main turbine through the pipe 48 may, as mentioned, become contaminated and the high-pressure casing 17 as well as the pipe 48 may have to be shielded, which is not difficult because these parts are comparatively small. However, after the steam leaves the turbine via the pipe 49, as shown in FIG. 1a, it enters the vessel 14' where it comes into intimate contact with the water, in which the radioactive parts are retained. The purified steam re-enters the reactor where, according to our invention, it does not come into contact with the nuclear fuel nor the high pressure steam, returning to the turbine via the pipe 45. Contamination of the plant components including the low-pressure casing 18, the condenser with all its accessories, and the feedwater preheating system is thus effectively prevented which simplifies the construction and operation, and is of particular significance in marine applications.

While in principle other points in the path of the steam flow could be selected for decontamination, the provision, according to our invention, of a special pressure vessel for this purpose at a point where the steam flows from an intermediate stage back to the reactor has special advantages and significance also from a thermodynamic point of view.

At the end of expansion in casing 17, for example from 100 atm. absolute and 450 deg. C. to 20 atm. abs., the steam temperature will have dropped to about 270 deg. C. which is only about 60 deg. C. above saturation temperature. When passing through the vessel 14' which normally is filled with water of about 210 deg. C. the steam will lose some of its small superheat by contact with the water, a small quantity of which will be evaporated. Most of the steam will not be condensed but will pass on, mixed with a small quantity of saturated steam to the reactor at a slightly lower temperature. Since the water level in the vessel 14′ has to be kept approximately constant, said vessel is fed with water through the pipe 32′ from pipe 32 (see FIG. 1) or any other source, preferably controlled by a water level regulator of any known type (not shown). Practically no heat is lost in the vessel 14′ which is simple and cheap to build. Water sprays instead of nozzles 47′ are feasible.

In order to avoid excessive concentration of radioactive components in the vessels 14 and 14′, both may be equipped with demineralizing devices of known types, working continuously or intermittently.

FIG. 2 illustrates schematically what modifications are necessary in the plant as per FIG. 1 if separate reactors are employed for superheating and reheating of the steam. Such arrangement may be of interest in large plants where independent close regulation of the reheat temperature is desired. Parts equivalent to parts in FIG. 1 are denoted by the same numerals. In this FIGURE 10 is the reactor with fuel assemblies 11, 12 and 12′ in which only superheating of the saturated steam entering through the conduit 40 is effected. 10′ is a second reactor with fuel assemblies 13 and 13′ in which only reheating of the steam branched off from the turbine through the conduit 49 takes place. Both reactors can be regulated independently of each other and the reactor 10′ may be put out of operation by closing the valves 34 and 49′ which may be advantageous when the power output of the steam turbine is small.

FIG. 3 illustrates a special embodiment of a reactor with triple passages for steam in the form of concentric tubes being part of the fuel assemblies. 60 is a pressure vessel with two tube plates 61 and 62 for the calandria-type tubes and header spaces 63 and 64 for the steam at reheat pressure. The tubular passages for steam are as follows: Tubes for superheating the high-pressure steam 65 (shown in more detail in FIGS. 4 and 5 in sectional views) containing the fuel elements 66, pass right through the pressure vessel 60 and are connected to intermediate headers 67, which in turn are connected at the inlet (left) side to the conduit 40 shown in FIG. 1 and at the outlet (right) to the conduit 44 of FIG. 1. Concentric with these tubes are the tubes 68, in communication at both ends with the header spaces 63 and 64, the annulus between these two tubes forming the passage for the steam at reheat pressure. Further, third concentric tubes 69 are provided which are at both ends fitted tight into the tube plates 61 and 62. The annular space between the tubes 68 and 69 serves also as tubular passage for steam at reheat pressure, and its cross section is reduced at one end by a lip 70, shown in FIG. 5, to act as orifice. The tubes 68 are kept positioned and on center relative to the tubes 69 by the rib spacers 68′, as are the tubes 65 relative to the tubes 68 by the rib spacers 65′.

The header space 63 is connected to the conduit 49 (see FIG. 1) serving as inlet for the steam expanded to the reheat pressure. The header space 64 is connected to conduit 45 (see FIG. 1) for leading the reheated steam back to the turbine. The space between the tube plates 61 and 62 surrounding the tubes 69 is filled with the moderator, for example heavy water, which enters the reactor through the tube 72 and can leave through the tube 73. The high-pressure tubes are closed at both ends by plugs which can be removed for withdrawing the fuel elements 66 when necessary, without dismantling the reactor, during operation of the reactor. Individual tubes can be sealed off at both ends by using special longer plugs. The moderator is preferably kept under a pressure a little higher than that of the steam in the annulus between the tubes 68 and 69, and at a temperature somewhat higher than the saturation temperature of the steam in said annulus. The annular space between the tubes 68 and 69 can also be filled with insulating material or it can be evacuated.

The operation of the reactor as per FIG. 3 is obvious when taken together with the FIG. 1 as far as the steam connections 40, 44, 45 and 49 are concerned.

The embodiment as shown in FIG. 3 has the following valuable features:

(1) By using the outer surface of the high-pressure tubes 65 for reheating the medium pressure steam, the nuclear fuel charge can be reduced.

(2) Since the interior of the reactor vessel 60 is exposed only to the reheat pressure, which is normally only about one quarter to one fifth of the boiler pressure, material is saved and fabrication facilitated.

(3) The high-pressure tubes 65 are exposed only to the difference between the high-pressure and the reheat pressure. This permits savings in expensive materials and fabrication.

(4) The tubes 69 are subjected inside and outside to approximately the same pressures which results in material savings, also neutron economy.

(5) Due to the orifice provided in the annulus between the tubes 68 and 69, the steam velocity is greatly reduced, with consequent reduction in heat transfer and heat loss to the moderator. This obviates special heat insulation at this point.

(6) Due to the fact that the moderator temperature may be kept somewhat higher than the saturation temperature of the reheat steam, condensation in tube 69 can be avoided.

(7) Safety is increased in case of damage to a fuel element because it can be removed and a high-pressure tube can be completely sealed off during operation of the reactor.

It is immaterial for the purposes of this invention what particular fissionable fuel is used in the reactor, what moderator and what type of regulation is employed. It is further immaterial what particular type of steam turbine is utilized with one or more shafts and what kind of power consumers it drives at constant or variable speeds. It is also within the scope of this invention to use more than one stage of reheating.

At present the use of natural uranium as fuel and heavy water as moderator is preferred, but our invention is not restricted to these materials.

Having now described and illustrated our invention, we wish it to be understood that our invention is not to be limited to the specific forms and arrangements of parts herein described and shown, or specifically covered by our claims.

What we claim is:

1. In combination a steam-cooled moderated nuclear reactor for producing high-pressure, high-temperature steam, a multi-stage steam turbine constructed to partially expand high-pressure steam, to have the partially expanded steam withdrawn and reheated, and then further expanded therein for producing useful power, said reactor having first and second fuel assemblies, first tubular passage means forming part of and in heat exchange relationship with said first fuel assemblies, said first tubular passage means receiving high-pressure saturated steam, second tubular passage means forming part of and in heat exchange relationship with said second fuel assemblies, said second tubular passage means receiving partially expanded steam, a closed pressure vessel disposed outside of said reactor, said vessel being filled with water up to a predetermined level, first conduit means connecting said pressure vessel at a point above the water level with the inlets to said first tubular passages, second conduit means connecting the outlets of said first tubular passages with said pressure vessel at a point below the water level in said vessel, thus forming a closed circuit path through said first tubular passages and back to the said closed vessel, a steam pump interposed in said first conduit means, a motor disposed to drive said pump, said pump regulatably moving saturated steam from said closed vessel through said first tubular passage means and back to said vessel, thus transferring nuclear heat from the fuel assemblies to the saturated steam, the resulting superheated steam being de-superheated on re-entry to said vessel by contact with the water in said vessel, thereby evaporating some of the water in said vessel, third conduit means branching off superheated steam from said second conduit means and connecting it to the high-pressure inlet of said steam turbine, fourth conduit means connecting a first intermediate stage of the steam turbine with the inlets to said second tubular passage means so as to lead partly expanded steam to re-enter the reactor where it is reheated, fifth conduit means connecting the outlets of said second tubular passage means with an intermediate stage of the steam turbine lower in pressure than said first intermediate stage for further expansion in the turbine.

2. A combination as set forth in claim 1, having each of the fuel assemblies equipped with dual tubular passages, one of which receives high-pressure saturated steam for superheating it, while the second receives intermediate pressure steam for reheating it.

3. In a combination as set forth in claim 2, dual tubular passage means consisting of two concentric tubes, the inner tube passing high-pressure saturated steam for superheating it, while the annular space between the two tubes passes intermediate pressure steam for reheating it.

4. A combination plant as set forth in claim 1, having fuel assemblies each equipped with triple tubular passage means consisting of three concentric tubes, with the inner tubes containing the fuel elements passing high-pressure saturated steam for superheating it, the annular space between the inner tubes and the next larger tubes passing intermediate pressure steam for reheating it, and the annulus between the second and third tubes passing intermediate pressure steam at low velocity for reducing the heat loss from the outer surface of said tubes to the moderator surrounding the fuel assemblies.

5. A combination as set forth in claim 1, wherein the fourth conduit means includes an interposed pressure vessel filled partly with water, for bringing the steam flowing through said fourth conduit means in direct contact with said water for retaining radioactive contaminants of the steam in said water.

6. A combination as set forth in claim 1, wherein the fourth conduit means includes an interposed pressure vessel, water nozzles spraying water under pressure from any available source into said vessel for bringing the steam flowing through said fourth conduit means into direct contact with the water from said sprays for retaining radioactive contaminants of the steam in said water.

7. In combination a first steam-cooled moderated nuclear reactor, a second steam-cooled moderated nuclear reactor, a multiple-stage steam turbine constructed to partially expand high-pressure steam, to have the partially expanded steam withdrawn and reheated, and then further expanded therein for producing useful power, said first reactor having first fuel assemblies, first tubular passage forming part of and in heat exchange relationship with said first fuel assemblies, said first tubular passage means receiving high-pressure saturated steam, said second reactor having second fuel assemblies, second tubular passages forming part of and in heat exchange relationship with said second fuel assemblies, said second tubular passages receiving partially expanded steam, a closed pressure vessel disposed outside said first and second reactors, said vessel being filled with water up to a predetermined level, first conduit means connecting said pressure vessel at a point above the water level with the inlet to said first tubular passage means, second conduit means connecting the outlet of said first tubular passage means with said pressure vessel at a point below the water level in said vessel, thus forming a closed circuit path through said first tubular passage means and back to said closed vessel, a steam pump interposed in said first conduit means, a motor disposed to drive said pump, said pump regulatably moving saturated steam from said closed vessel through said first tubular passage means and back to said vessel, thus transferring nuclear heat from the said first fuel assemblies to the saturated steam, the resulting superheated steam being de-superheated on re-entry to said vessel by contact with the water in said vessel thereby evaporating some of the water in said vessel, third conduit means branching off super-heated steam from said second conduit means and connecting it to the high-pressure inlet of said steam turbine, fourth conduit means connecting a first intermediate stage of the steam turbine with the inlet to said second tubular passage means so as to lead partially expanded steam to enter the second reactor where it is reheated, and fifth conduit means connecting the outlet of said second tubular passage means with an intermediate stage of the steam turbine lower in pressure than said first intermediate stage for further expansion in the turbine.

References Cited in the file of this patent

UNITED STATES PATENTS

| 2,938,845 | Treshow | May 31, 1960 |

FOREIGN PATENTS

| 1,141,064 | France | Mar. 11, 1957 |
| 1,051,425 | Germany | Feb. 26, 1959 |
| 1,198,728 | France | June 15, 1959 |